US008281816B2

(12) United States Patent
Nakata et al.

(10) Patent No.: US 8,281,816 B2
(45) Date of Patent: Oct. 9, 2012

(54) FLUID CONTROL APPARATUS

(75) Inventors: Tomohiro Nakata, Osaka (JP); Tsutomu Shinohara, Osaka (JP); Michio Yamaji, Osaka (JP)

(73) Assignee: Fujikin Incorporated, Osaka-shi (JP)

( * ) Notice: Subject to any disclaimer, the term of this patent is extended or adjusted under 35 U.S.C. 154(b) by 416 days.

(21) Appl. No.: 12/451,644

(22) PCT Filed: May 26, 2008

(86) PCT No.: PCT/JP2008/059633
§ 371 (c)(1), (2), (4) Date: Nov. 23, 2009

(87) PCT Pub. No.: WO2008/146780
PCT Pub. Date: Dec. 4, 2008

(65) Prior Publication Data
US 2010/0132819 A1 Jun. 3, 2010

(30) Foreign Application Priority Data
May 31, 2007 (JP) ................................ 2007-144932

(51) Int. Cl.
*F16K 11/10* (2006.01)

(52) U.S. Cl. ........................................................ 137/884

(58) Field of Classification Search .................. 137/269, 137/270, 597, 884
See application file for complete search history.

(56) References Cited

U.S. PATENT DOCUMENTS 6,116,283 A * 9/2000 Yamaji et al. ................. 137/884
6,216,739 B1 * 4/2001 Fukushima et al. .......... 137/884
6,415,822 B1 * 7/2002 Hollingshead ................ 137/884
6,769,463 B2 * 8/2004 Vu ................................ 141/98
6,953,048 B2 * 10/2005 Chuh ........................... 137/269
7,874,316 B2 * 1/2011 Okabe et al. .................. 137/884
8,042,573 B2 * 10/2011 Tokuda et al. ................ 137/884

FOREIGN PATENT DOCUMENTS

JP 10-227368 A 8/1998
JP 2000-018409 A 1/2000
JP 2002-276837 A 9/2002
JP 2003-086579 A 3/2003
JP 2005-164021 A 6/2005
JP 2006-521522 9/2006
WO WO-2004/087560 A2 10/2004

OTHER PUBLICATIONS

International Search Report dated Jul. 8, 2008, issued on PCT/JP2008/059633.

* cited by examiner

*Primary Examiner* — John Fox

(74) *Attorney, Agent, or Firm* — Edwards Wildman Palmer LLP

(57) ABSTRACT

There is provided a fluid control apparatus which enables reducing widths of lines for further reducing space occupied by the apparatus. Support flow-channel blocks 9 and 10 are constituted by large block portions 25 and 27 which have openings of fluid flow channels 9*a* and 10*a* abutted against openings of fluid flow channels 11*c* and 11*d* in extended flow-channel blocks 11*a* and 11*b* with seal portions 20 interposed therebetween and, also, are abutted against lower surfaces of the extended flow-channel blocks 11*a* and 11*b*, and small block portions 26 and 28 which have lower surfaces flushed with the large block portions 25 and 27 and have heights smaller than those of the large block portions. The small block portions 26 and 28 are provided with male-screw-members insertion holes 26*a* and 28*a* for mounting the support flow-channel blocks 9 and 10 to a base member 30.

2 Claims, 4 Drawing Sheets

1
2
2a
3
4
4a
5
6
6a
7
7a
8
9
9a
10
10a
11
11a
11b
11c
11d
12
12a
13
14
16
17
19
20
23
24
25
26
26a
27
28
28a 1
16
17
12
19
11b
11
11a
19
17
7a
7
6a
6
4a
4
2a
2
15
17
14

1
2
2a
3
4
4a
5
6
6a
7
7a
8
11
11a
11b
11c
11d
12
12a
13
14
16
17
19
20
23
24
31
31a
32
32a
35
36
36a
37
38
38a

FLUID CONTROL APPARATUS

TECHNICAL FIELD

The present invention relates to a fluid control apparatus used in a semiconductor manufacturing apparatus and the like and, more particularly, relates to a fluid control apparatus formed by integrating a plurality of fluid control devices with one another.

BACKGROUND ART

In a fluid control apparatus used in a semiconductor manufacturing apparatus, there has been advanced integration for arranging a plurality of fluid control devices in series and connecting the devices to one another without interposing pipes and joints thereamong for forming and installing a plurality of lines in parallel with one another on a base member. As such a fluid control apparatus, Patent Document 1 discloses a fluid control apparatus which includes a plurality of block-shaped joint members that form a lower-stage layer and are mounted to a base member through male screw members and further includes a plurality of fluid control devices that form an upper-stage layer and are mounted to straddle joint members adjacent to each other.

Patent Document 1: Japanese Unexamined Patent Publication No. 10-227368

DISCLOSURE OF THE INVENTION

Problems to be Solved by the Invention

The fluid control apparatus in Patent Document 1 has an advantage that space occupied by the apparatus and volumes of flow channels can be reduced in comparison with conventional apparatuses, but there has been a need for further reduction of the space occupied by the apparatus, particularly reduction of widths of the respective lines.

It is an object of the present invention to provide a fluid control apparatus which enables reducing the widths of lines for further reducing the space occupied by the apparatus.

Means for Solving the Problems

A fluid control apparatus according to the present invention includes: a fluid controller; extended flow-channel blocks provided at opposite sides of the fluid controller and having a fluid flow channel communicated with a corresponding fluid flow channel of the fluid controller; and a pair of support flow-channel blocks which have fluid flow channels communicated with the fluid flow channels of the extended flow-channel blocks and are secured to a base member to support the fluid controller, wherein each of the support flow-channel blocks includes a large block portion which has a fluid flow channel and an opening thereof abutted against an opening of the fluid flow channel in each of the extended flow-channel blocks with seal means interposed therebetween and, also, is in contact with a lower surface of each of the extended flow-channel blocks, and a small block portion which has a lower surface flushed with the large block portion and has a height smaller than a height of the large block portion, and the small block portion is provided with a male-screw-member insertion hole for mounting each of the support flow-channel blocks to the base member.

In the present specification, the terms “upper” and “lower” refer to upper and lower sides in FIG. 1. It should be noted that the terms “upper” and “lower” are merely for convenience and, for example, the arrangement can be made such that left and right sides in FIG. 1 exist in the upper and lower sides, and the terms “upper” and “lower” are not coincident with the upper and lower sides at the time of installation.

Various types of fluid control devices which are used in the fluid control apparatus of this type have been increasingly standardized in size, and shut-off valves, pressure reducing valves, pressure indicators and the like can be mounted in the same manner. Generally, the support flow-channel blocks which support fluid control devices of such standard types are provided with two openings arranged in the direction of lines, and the support flow-channel blocks are secured to a base member, through a pair of male screw members arranged in the widthwise direction, midway between the two openings. On the contrary, flow-rate adjustment devices (mass flow controllers) have larger lengths in the direction of lines than those of fluid control devices of such standard types. A flow-rate adjustment device (an example of a “fluid controller” according to the present invention) is provided at its opposite sides with extended flow-channel blocks and is structured to be supported by a pair of support flow-channel blocks secured to the base member. Each of the support flow-channel blocks is provided with only a single opening of a fluid flow channel which is abutted against an opening of a fluid flow channel in the corresponding extended flow-channel block with a seal portion interposed therebetween. In this case, if an attempt is made to mount the support flow-channel blocks in the same manner as that for the support flow-channel blocks for fluid control devices of standard types, it is necessary to provide screw insertion holes with a seal portion sandwiched therebetween (outside of the seal portion in the widthwise direction), which makes it harder to reduce the width. Therefore, in each of the support flow-channel blocks, in addition to the large block portion which has the opening and is in contact with the lower surface of the extended flow-channel block, the small block portion having lower surface flushed with the large block portion and having a smaller height than that of the large block portion is provided. The small block portions are mounted to the base member, which eliminates the necessity of providing spaces for mounting male screw members at the opposite sides in the widthwise direction with respect to the seal portion, thereby enabling reduction of the width.

The extended flow-channel blocks may be mounted to the fluid controller main body, such that the lower surfaces of the extended flow-channel blocks are at positions higher than the lower surface of the fluid controller main body, and the large block portions may be brought into contact at their top-portion side surfaces with the side surfaces of the flow-rate adjustment device main body. Further, the extended flow-channel blocks may have lower surfaces flushed with the lower surface of the fluid controller main body. Further, there is provided only a single male screw member from above for mounting each extended flow-channel block to the corresponding support flow-channel block, and the single male screw member may be provided outside the seal means.

The seal means includes a gasket interposed between joint members and annular gasket-pressing protrusions formed on the abutting surfaces of the joint members, and is adapted to ensure sealing property by deforming the gasket by the annular gasket-pressing protrusions.

The male screw members are preferably made of a stainless steel (SUS304, SUS316 and the like), and the joint members are also preferably made of a stainless steel (SUS304, SUS316 and the like). The gaskets are preferably formed to have an annular shape (a disk shape with a hole) made of a stainless steel, a nickel alloy and the like.

Effects of the Invention

With the fluid control apparatus according to the present invention, small block portions are mounted to a base member, which eliminates necessity of providing spaces for mounting male screw members at opposite sides in a widthwise direction with respect to seal portions, thereby enabling a reduction of widths of support flow-channel blocks and fluid control devices. This enables reducing widths of the respective lines in the fluid control apparatus, thereby reducing the space occupied by the apparatus.

Figure 1:
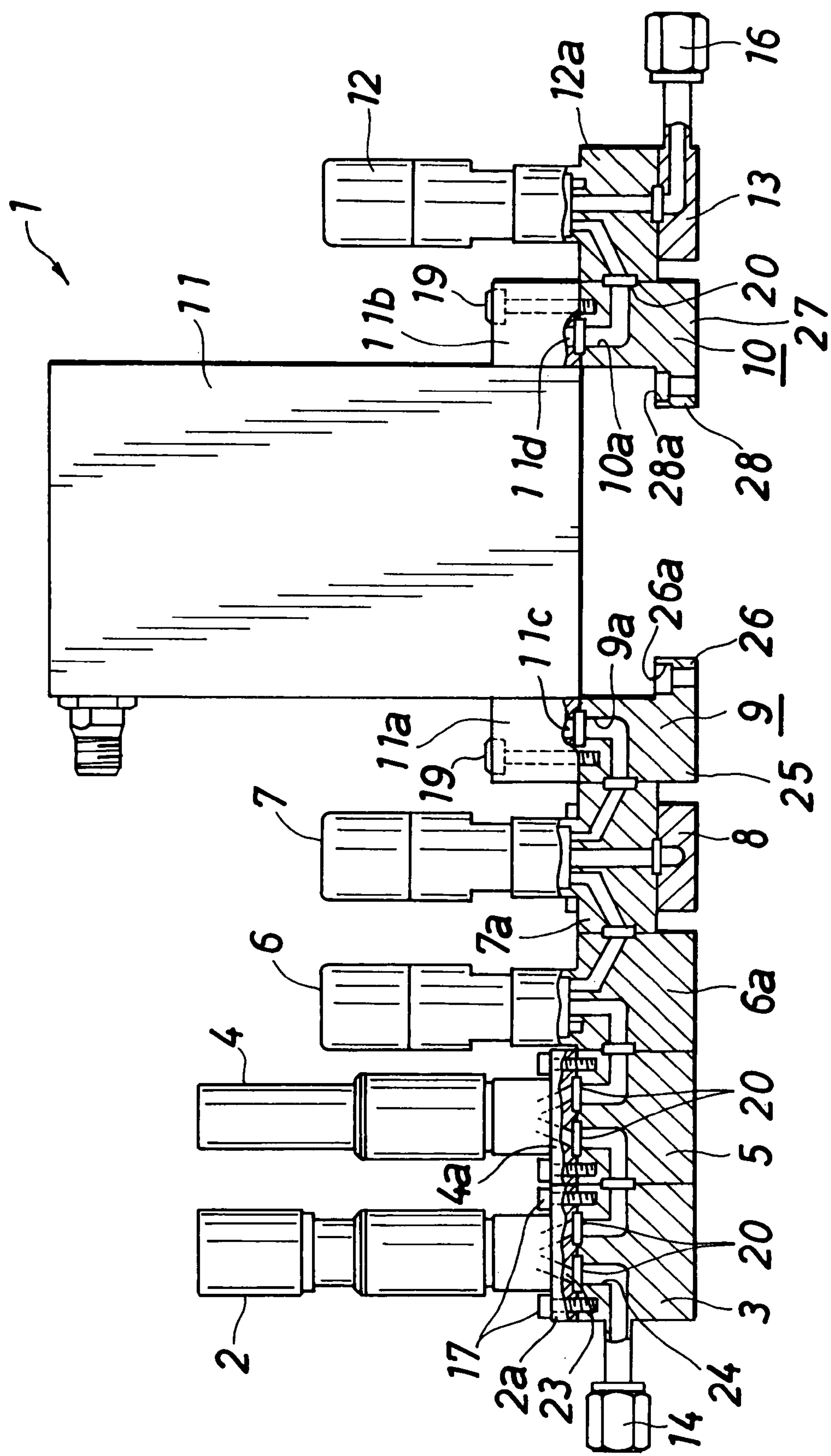
FIG. 1 is a longitudinal cross-sectional view illustrating a first embodiment of a fluid control apparatus according to the present invention.

DESCRIPTION OF THE REFERENCE NUMERALS (1) Fluid control apparatus
(9), (10), (31), (32) Support flow-channel block
(9*a*), (10*a*), (31*a*), (32*a*) Fluid flow channel
(11) Flow-rate adjustment device (fluid controller)
(11*a*), (11*b*) Extended flow-channel block
(11*c*), (11*d*) Fluid flow channel
(20) Seal portion (seal means)
(25), (27), (35), (37) Large block portion
(26), (28), (36), (38) Small block portion
(26*a*), (28*a*), (36*a*), (38*a*) Male-screw-member insertion hole
(30) Base member

BEST MODE FOR CARRYING OUT THE INVENTION

Hereinafter, an embodiment of the present invention will be described with reference to the drawings.

Figure 2:
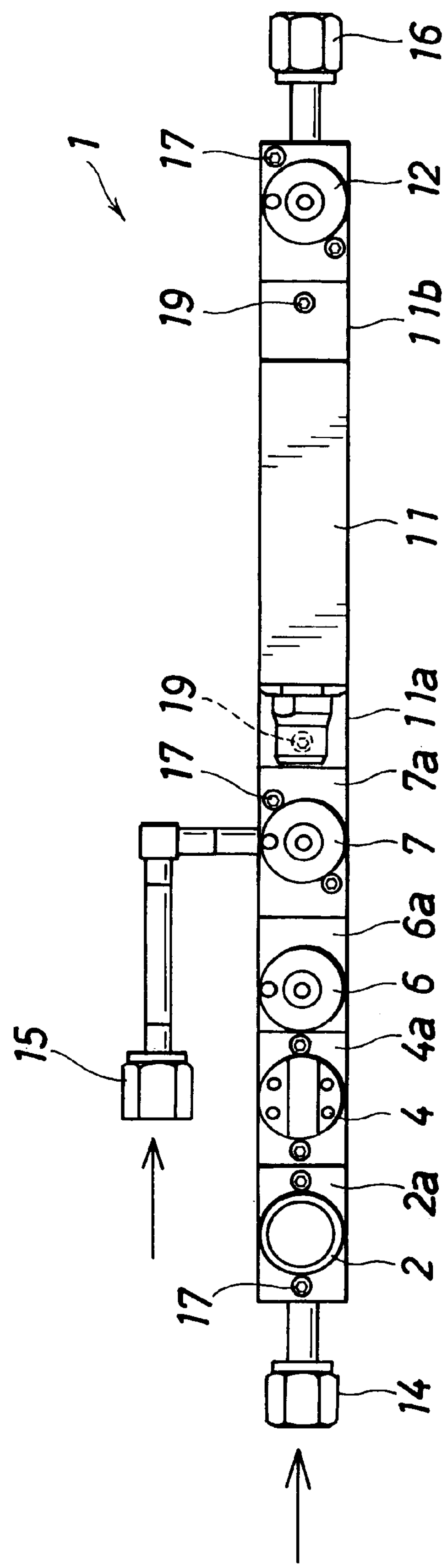
FIG. 2 is a plan view of the same.
Figure 3:
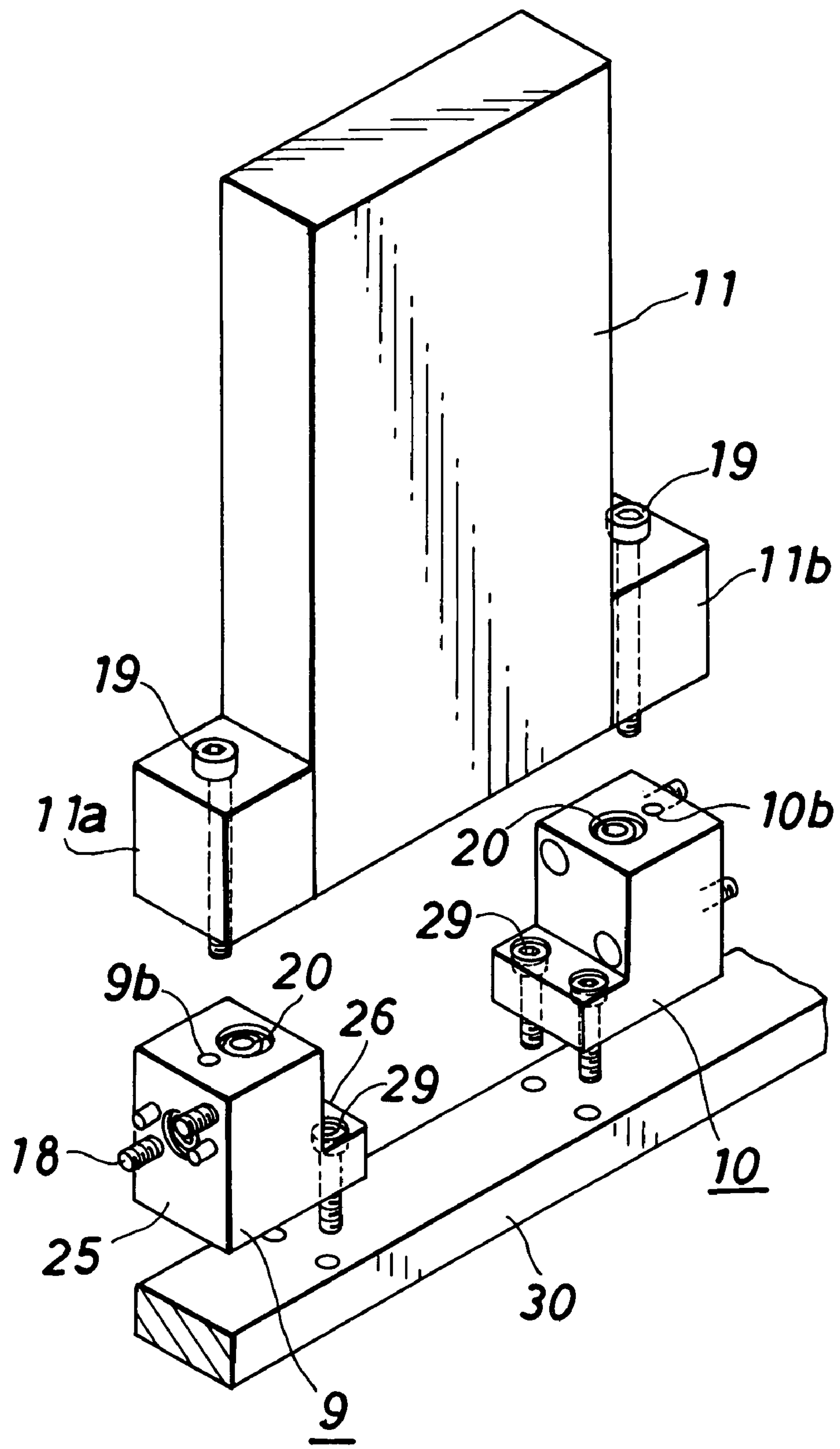
FIG. 3 is an enlarged exploded perspective view of main parts of the same.

FIGS. 1 to 3 illustrate a first embodiment of a fluid control apparatus according to the present invention.

A fluid control apparatus (1) is used in a semiconductor manufacturing apparatus and the like and includes a pressure reducing valve (a fluid control device of a standard type) (2) having a connection flow-channel block (2*a*) at its lower end; a first support flow-channel block (3) which supports the pressure reducing valve (2); a pressure indicator (a fluid control device of a standard type) (4) which is arranged adjacent to the outlet side (the right side in the figure) of the pressure reducing valve (2) and has a connection flow-channel block (4*a*) at its lower end; a second support flow-channel block (5) which supports the pressure indicator (4); a first shut-off valve (a fluid control device of a standard type) (6) which is arranged adjacent to the outlet side of the pressure indicator (4) and has a main body (6*a*) formed integrally with its lower side at the same level as that of the support flow-channel blocks (3) and (5); a second shut-off valve (a fluid control device of a standard type) (7) which is arranged adjacent to the outlet side of the first shut-off valve (6) and has a main body (7*a*) which is formed integrally therewith to have a smaller height than that of the main body (6*a*) in the first shut-off valve (6); a third support flow-channel block (8) which has a lower surface at the same level as that of the lower surfaces of the support flow-channel blocks (3) and (5) and supports the second shut-off valve (7); a fourth support flow-channel block (9) which is arranged adjacent to the outlet side of the main body (7*a*) in the second shut-off valve (7); a fifth support flow-channel block (10) which is arranged oppositely to the outlet side of the fourth support flow-channel block (9) with a predetermined interval interposed therebetween; a flow-rate adjustment device (a fluid controller according to the present invention) (11) which has extended flow-channel blocks (11*a*) and (11*b*) at its inlet side (the left side in the figure) and its outlet side, respectively, and, also, is supported such that it straddles the fourth and fifth support flow-channel blocks (9) and (10) by being supported at the inlet-side extended flow-channel block (11*a*) and the outlet-side extended flow-channel block (11*b*) by the fourth support flow-channel block (9) and the fifth support flow-channel block (10), respectively; a third shut-off valve (a fluid control device of a standard type) (12) which is arranged adjacent to the outlet side of the fifth support flow-channel block (10) and has a main body (12*a*) which is formed integrally therewith to have a smaller height than that of the fifth support flow-channel block (10); and a sixth support flow-channel block (13) which has a lower surface at the same level as that of the lower surfaces of the other support flow-channel blocks (3), (5), (8) and (9) and supports the third shut-off valve (12).

A process-gas introducing joint (14) for supplying a process gas to the pressure reducing valve (2) is connected to the first support flow-channel block (3). A purge-gas introducing joint (15) for supplying a purge gas to the second shut-off valve (7) is connected to the third support flow-channel block (8). A process-gas/purge-gas discharge joint (16) for discharging the process gas and the purge gas through the third shut-off valve (12) is connected to the sixth support flow-channel block (13).

In assembling the respective members (2), (3), (4), (5), (6), (7), (8), (9), (10), (11), (12) and (13), male screw members (18) in a front and rear direction, as well as male screw members (17) and (19) from above, are used and, also, the respective support flow-channel blocks (3), (5), (8), (9), (10) and (13), the main bodies (6*a*), (7*a*) and (12*a*) in the respective shut-off valves (6), (7) and (12), the connection block portions (2*a*) and (4*a*) in the respective fluid control devices (2), (4) and (11), and the extended flow-channel blocks (11*a*) and (11*b*) are abutted against one another with seal portions (seal means) (20) interposed thereamong.

The pressure reducing valve (2) and the pressure indicator (4) are connected to the support flow-channel blocks (3) and (5) corresponding thereto at fluid flow channels (23) and (24) therein at two positions spaced apart from each other forwardly and rearwardly by a predetermined interval. Corresponding thereto, two seal portions (20) spaced part from each other forwardly and rearwardly by a predetermined interval are provided among the pressure reducing valve (2), the pressure indicator (4) and the support flow-channel blocks (3) and (5).

FIG. 3 is a view illustrating, in detail, the flow-rate adjustment device (11) as an example of the fluid controller according to the present invention and the pair of support flow-channel blocks (9) and (10) which support the flow-rate adjustment device (11). As illustrated in FIGS. 1 and 3, the pair of support flow-channel blocks (9) and (10) which support the flow-rate adjustment device (11) are constituted by large block portions (25) and (27) which have openings of fluid flow channels (9*a*) and (10*a*) abutted against openings of fluid flow channels (11*c*) and (11*d*) in the extended flow-channel blocks (11*a*) and (11*b*) with seal portions (20) interposed therebetween and, also, are in contact with the lower surfaces of the extended flow-channel blocks (11*a*) and (11*b*), and small block portions (26) and (28) provided integrally with the large block portions (25) and (27) such that they are positioned under the flow-rate adjustment device (11), respectively. The small block portions (26) and (28) are shaped to have lower surfaces flushed with the large block portions (25) and (27) and have heights smaller than those of the large block portions. The small block portions (26) and (28) are provided with male-screw-members insertion holes (26*a*) and (28*a*) for mounting the respective support flow-channel blocks (9) and (10) to a base member (30) made of an aluminum sheet metal.

There is only a single male screw member (19) from above for mounting each extended flow-channel block (11*a*) and (11*b*) to the corresponding support flow-channel block (9) and (10), and the tip end portion thereof is screwed into a female screw portion (9*b*) and (10*b*) provided outside of the seal means (20) in the support flow-channel block (9) and (10) in the front and rear direction. Further, the small block portions (26) and (28) in the respective support flow-channel blocks (9) and (10) are provided with two male-screw-member insertion holes (26*a*) and (28*a*) arranged in the widthwise direction, and the respective support flow-channel blocks (9) and (10) are mounted to the base member (30) through two male screw members (29).

Figure 4:
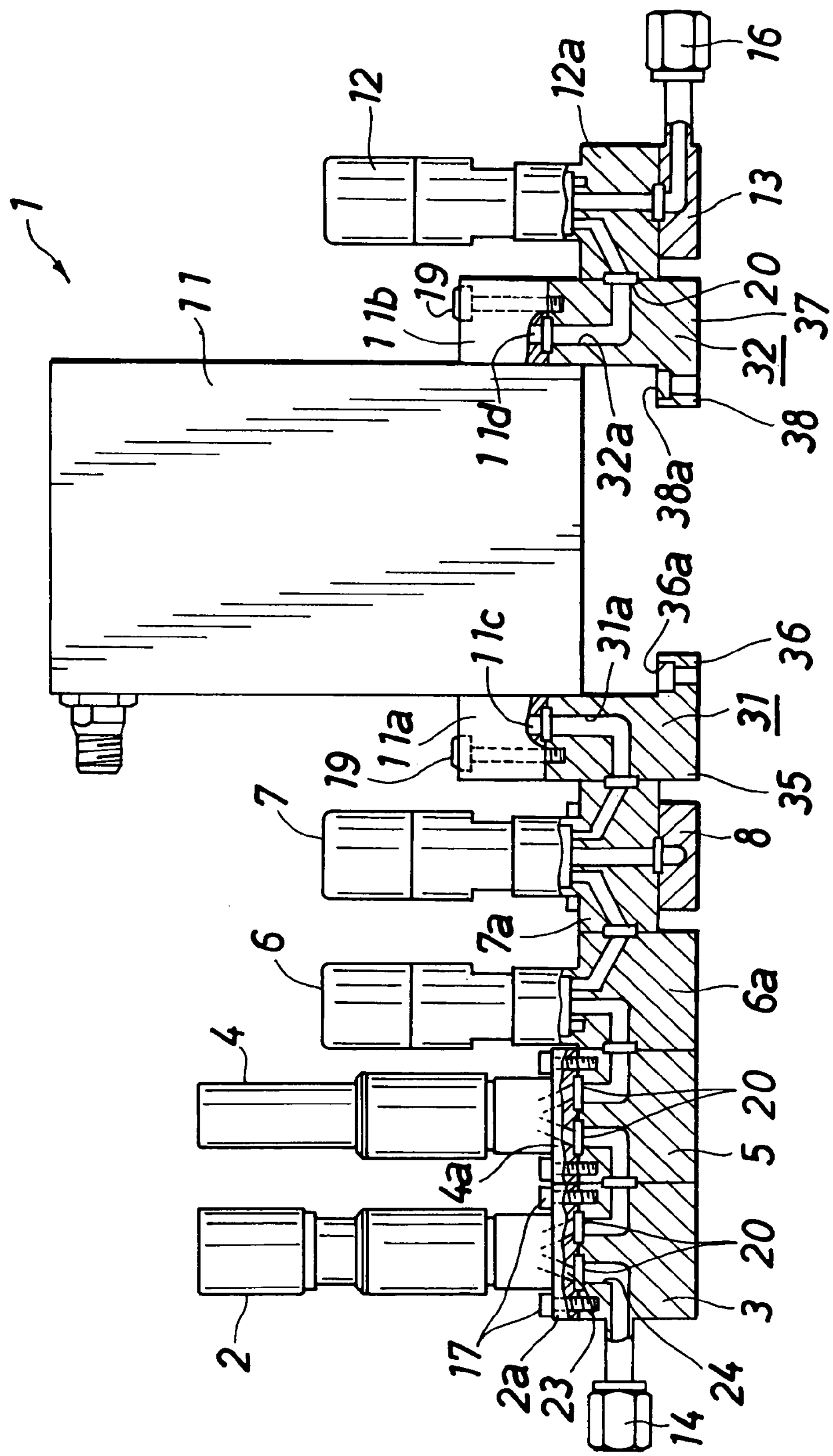
FIG. 4 is a longitudinal cross-sectional view illustrating a second embodiment of the fluid control apparatus according to the present invention.

FIG. 4 illustrates a second embodiment of the fluid control apparatus according to the present invention. The second embodiment is different from the first embodiment only in the flow-rate adjustment device (11) and the pair of the support flow-channel blocks (9) and (10) which supports the flow-rate adjustment device (11). Hereinafter, the same structures as those of the first embodiment will be denoted by the same reference characters and descriptions thereof will not be given, and only the different portions will be described.

Referring to FIG. 4, the extended flow-channel blocks (11*a*) and (11*b*) are mounted to the flow-rate adjustment device main body (11), such that the lower surfaces of the extended flow-channel blocks are at positions higher than the lower surface of the flow-rate adjustment device main body (11).

Further, the pair of support flow-channel blocks (31) and (32) which support the flow-rate adjustment device (11) are constituted by large block portions (35) and (37) which have openings of fluid flow channels (31*a*) and (32*a*) abutted against openings of the fluid flow channels (11*c*) and (11*d*) in the extended flow-channel blocks (11*a*) and (11*b*) with seal portions (20) interposed therebetween and, also, are in contact with the lower surfaces of the extended flow channel blocks (11*a*) and (11*b*), and small block portions (36) and (38) provided integrally with the large block portions (35) and (37) such that they are positioned under the flow-rate adjustment device (11). The respective large block portions (35) and (37) are adapted to have a larger height than that in FIG. 1 and are in contact at their top-portion side surfaces with the side surfaces of the flow-rate adjustment device main body (11), corresponding to the fact, that the lower surfaces of the extended flow-channel blocks (11*a*) and (11*b*) are at positions higher than the lower surface of the flow-rate adjustment device main body (11).

The other structures are the same as those of the first embodiment, and the small block portions (36) and (38) are shaped to have lower surfaces flushed with the large block portions (35) and (37) and have heights smaller than those of the large block portions. The small block portions (36) and (38) are provided with male-screw-member insertion holes (36*a*) and (38*a*) for mounting the respective support flow-channel blocks (31) and (32) to a base member (30). Further, similarly to FIG. 3, the respective support flow-channel blocks (31) and (32) are mounted to the base member (30) through two male screw members (29) inserted in the male-screw member insertion holes (36*a*) and (38*a*) which are provided in the small block portions (36) and (38).

Industrial Applicability

Widths of the respective lines in a fluid control apparatus can be reduced, and space occupied by the apparatus can be reduced and, therefore, by applying the present invention to a fluid control apparatus used in a semiconductor manufacturing apparatus and the like, it is possible to contribute to an improvement in performance of the semiconductor manufacturing apparatus and the like.

The invention claimed is:

1. A fluid control apparatus comprising:

a fluid controller;

extended flow-channel blocks provided at opposite sides of the fluid controller and having a fluid flow channel communicated with a corresponding fluid flow channel of the fluid controller; and a pair of support flow-channel blocks which have fluid flow channels communicated with the fluid flow channels of the extended flow-channel blocks and are secured to a base member to support the fluid controller, wherein each of the support flow-channel blocks includes a large block portion which has a fluid flow channel and an opening thereof abutted against an opening of the fluid flow channel in each of the extended flow-channel blocks with seal means interposed therebetween and, also, is in contact with a lower surface of each of the extended flow-channel blocks, and a small block portion which has a lower surface flushed with the large block portion and has a height smaller than a height of the large block portion, and the small block portion is located under the fluid controller and is provided with a male-screw-member insertion hole for mounting each of the support flow-channel blocks to the base member, and wherein each of the extended flow-channel blocks is mounted to the fluid controller main body, such that the lower surface of the extended flow-channel block is at a position higher than a lower surface of the fluid controller main body, and a top-portion side surface of the large block portion is in contact with a side surface of a flow-rate adjustment device main body.

2. A fluid control apparatus comprising:

a fluid controller;

extended flow-channel blocks provided at opposite sides of the fluid controller and having a fluid flow channel communicated with a corresponding fluid flow channel of the fluid controller; and a pair of support flow-channel blocks which have fluid flow channels communicated with the fluid flow channels of the extended flow-channel blocks and are secured to a base member to support the fluid controller, wherein each of the support flow-channel blocks includes a large block portion which has a fluid flow channel and an opening thereof abutted against an opening of the fluid flow channel in each of the extended flow-channel blocks with seal means interposed therebetween and, also, is in contact with a lower surface of each of the extended flow-channel blocks, and a small block portion which has a lower surface flushed with the large block portion and has a height smaller than a height of the large block portion, and the small block portion is located under the fluid controller and is provided with a male-screw-member insertion hole for mounting each of the support flow-channel blocks to the base member, and wherein a single male screw member from above for mounting each of the extended flow-channel blocks to the corresponding support flow-channel block is provided outside the seal means.

* * * * *